US009919465B1

(12) United States Patent
Tseng et al.

(10) Patent No.: US 9,919,465 B1
(45) Date of Patent: Mar. 20, 2018

(54) MOLDING SYSTEM FOR PREPARING AN INJECTION MOLDED FIBER REINFORCED COMPOSITE ARTICLE

(71) Applicant: CORETECH SYSTEM CO., LTD., Hsinchu County (TW)

(72) Inventors: Huan-Chang Tseng, Hsinchu County (TW); Rong-Yeu Chang, Hsinchu County (TW); Chia-Hsiang Hsu, Hsinchu County (TW)

(73) Assignee: CORETECH SYSTEM CO., LTD., Hsinchu County (TW)

( * ) Notice: Subject to any disclaimer, the term of this patent is extended or adjusted under 35 U.S.C. 154(b) by 0 days.

(21) Appl. No.: 15/664,793

(22) Filed: Jul. 31, 2017

(51) Int. Cl.
  *B29C 45/77* (2006.01)
  *B29C 45/00* (2006.01)

(52) U.S. Cl.
  CPC .......... *B29C 45/77* (2013.01); *B29C 45/0005* (2013.01); *B29C 2045/0006* (2013.01); *B29C 2945/76056* (2013.01); *B29C 2945/76381* (2013.01); *B29C 2945/76545* (2013.01); *B29C 2945/76859* (2013.01)

(58) Field of Classification Search
  CPC ................ B29C 45/77; B29C 45/0005; B29C 2045/0006; B29C 2945/76056; B29C 2945/76381; B29C 2945/76545; B29C 2945/76859
  USPC ...................................................... 425/162
  See application file for complete search history.

(56) References Cited

U.S. PATENT DOCUMENTS

| 8,571,828 | B2 | 10/2013 | Tseng et al. |
| 9,283,695 | B1 | 3/2016 | Tseng et al. |
| 9,573,307 | B1 * | 2/2017 | Tseng .................. B29C 45/7693 |

OTHER PUBLICATIONS

Phelps, J. H. and C. L. Tucker III, "An Anisotropic Rotary Diffusion Model for Fiber Orientation in Short- and Long-Fiber Thermoplastics." J Non-Newtonian Fluid Mech 156 165-176 (2009).
Tseng, H.-C., R.-Y. Chang, and C.-H. Hsu, "An Objective Tensor to Predict Anisotropic Fiber Orientation in Concentrated Suspensions." J Rheol 60 215-224 (2016).
(Continued)

*Primary Examiner* — Alison L Hindenlang
*Assistant Examiner* — Yunju Kim
(74) *Attorney, Agent, or Firm* — WPAT, P.C., Intellectual Property Attorneys; Anthony King (57) ABSTRACT

A molding system includes a mold having a mold cavity; a molding machine configured to fill the mold cavity with a composite molding resin including a polymeric material having a plurality of fibers; a computing apparatus connected to the molding machine; and a controller connected to the computing apparatus. The computing apparatus includes a processor configured to generate a previous orientation distribution of the fibers in the mold cavity based on a molding condition for the molding machine, a rotary diffusional distribution of the fibers based on the previous orientation distribution of the fibers, and an updated orientation distribution of the fibers based on the rotary diffusional distribution of the fibers. The controller is configured to control the molding machine to perform an actual molding with the molding condition for injecting the composite molding resin into at least a portion of the mold cavity.

28 Claims, 9 Drawing Sheets

(56) References Cited

OTHER PUBLICATIONS

Tseng, H.-C., R.-Y. Chang, and C.-H. Hsu, "Numerical Prediction of Fiber Orientation and Mechanical Performance for Short/Long Glass and Carbon Fiber-Reinforced Composites." Campos Sci and Technol 144 51-56 (2017).

Tseng, H.-C., R.-Y. Chang, and C.-H. Hsu, "Phenomenological Improvements to Predictive Models of Fiber Orientation in Concentrated Suspensions." J Rheol 57 1597-1631 (2013).

Nguyen, N., X. Jin, J. Wang, J. H. Phelps, C. L. Tucker III, V. Kunc, S. K. Bapanapalli, and M. T. Smith, "Implementation of New Process Models for Tailored Polymer Composite Structures into Processing Software Packages." The US Department of Energy, Pacific Northwest National Laboratory, PNNL Report under Contract DE-AC05-76RL01830 PNNL-19185 (2010).

Rong-Yeu Chang, Wen Hsien Yang, Numerical simulation of mold filling in injection molding using a three-dimensional finite volume approach, International Journal for Numerical Methods in Fluids, 37, pp. 125-148, 2001.

U.S. Appl. No. 15/449,436.

\* cited by examiner

MOLDING SYSTEM FOR PREPARING AN INJECTION MOLDED FIBER REINFORCED COMPOSITE ARTICLE

TECHNICAL FIELD

The present disclosure relates to a molding system for preparing an injection molded fiber-reinforced composite article using a computer-aided engineering (CAE) simulation.

DISCUSSION OF THE BACKGROUND

Fiber-reinforced thermoplastic (FRT) composites, produced by molding techniques such as injection molding, greatly reduce assembly costs and vehicle weight. Use of FRTs to replace metals continues to show strong growth in automotive industrial products so as to improve specific mechanical properties, including tensile properties, thermal expansion, electrical conductivity, and water penetrability. More importantly, these properties are strongly dependent on fiber orientation states. However, fiber orientation behavior regarding the plurality of fibers immersed in a polymeric matrix flowing through a filling mold of an injection process is very complex. Therefore, the model for describing orientation states of fibers is of great importance.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a molding system for preparing an injection-molded fiber-reinforced composite article. In some embodiments, the molding system comprises: a mold having a mold cavity; a molding machine configured to fill the mold cavity with a composite molding resin including a polymeric material having a plurality of fibers; a computing apparatus connected to the molding machine, wherein the computing apparatus comprises a processor configured to generate a previous orientation distribution of the fibers in the mold cavity based on a molding condition for the molding machine, a rotary diffusional distribution of the fibers based on the previous orientation distribution of the fibers, and an updated orientation distribution of the fibers based on the rotary diffusional distribution of the fibers; and a controller connected to the computing apparatus and configured to control the molding machine with the molding condition to perform an actual molding for injecting the composite molding resin into at least a portion of the mold cavity.

In some embodiments of the present disclosure, the previous orientation distribution of the fibers is independent of a shear rate distribution of the composite molding resin in the mold cavity.

In some embodiments of the present disclosure, the rotary diffusional distribution of the fibers is independent of a fiber-polymer interaction.

In some embodiments of the present disclosure, the rotary diffusional distribution of the fibers is represented using an expression:

$$D_r = C_I R \hat{d}_r R^T$$

$$R = [e_1, e_2, e_3]$$

$$\hat{d}_r = \begin{bmatrix} d_1 & 0 & 0 \\ 0 & d_2 & 0 \\ 0 & 0 & d_3 \end{bmatrix}$$

Where $C_I$ represents an inter-fiber interaction, $D_r$ represents the rotary diffusional distribution of the fibers, R represents eigenvalues of the previous orientation distribution of the fibers, $R^T$ represents a transpose of R, and $d_1$, $d_2$, $d_3$ represents probability ratios of the fibers lying along three orthogonal directions.

In some embodiments of the present disclosure, the rotary diffusional distribution of the fibers is represented using an expression:

$$D_r = C_I R \hat{d}_r R^T$$

$$\hat{d}_r = \begin{bmatrix} 1 & 0 & 0 \\ 0 & \Omega & 0 \\ 0 & 0 & 1-\Omega \end{bmatrix}$$

Where $C_I$ represents an inter-fiber interaction, $D_r$ represents the rotary diffusional distribution of the fibers, R represents eigenvalues of the previous orientation distribution of the fibers, $R^T$ represents a transpose of R, $\Omega$ is a constant, and $0.5 \leq \Omega \leq 1$.

In some embodiments of the present disclosure, the processor is also configured to generate an updated rotary diffusional distribution of the fibers based on the updated orientation distribution of the fibers.

In some embodiments of the present disclosure, an effect of a shear rate distribution of the composite molding resin to the updated rotary diffusional distribution of the fibers is introduced through the updated orientation distribution.

In some embodiments of the present disclosure, the processor is further configured to generate updated eigenvalues of the updated orientation distribution of the fibers.

In some embodiments of the present disclosure, the processor is configured to generate the rotary diffusional distribution of the fibers based on the inter-fiber interaction, which is independent of a shear rate distribution of the composite molding resin in the mold cavity.

In some embodiments of the present disclosure, the processor is configured to generate the rotary diffusional distribution of the fibers based on a constant inter-fiber interaction.

In some embodiments of the present disclosure, the rotary diffusional distribution of the fibers is independent of a velocity distribution of the composite molding resin in the mold cavity.

The mechanical property of the molded article is correlated with the orientation distribution of the fibers. If the simulated orientation distribution of the fibers with the corresponding mechanical property does not meet the specification of the molded FRT article, the fiber parameters or the molding condition may be adjusted, and another simulation is performed to obtain an updated orientation distribution of the fibers in the composite molding resin while using the adjusted fiber parameter or the molding condition. To obtain the orientation distribution of the fibers in the composite molding resin injected into the mold cavity, the present disclosure generates the rotary diffusional distribution of the fibers based on the previous orientation distribution of the fibers, and generates the updated orientation distribution of the fibers based on the rotary diffusional distribution of the fibers. Consequently, the present disclosure can accurately and efficiently predict the orientation distribution of the fibers in the composite molding resin and the mechanical property of the molded FRT article.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system for preparing an injection-molded fiber-reinforced composite article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Injection molding is a technology commonly used for high-volume manufacturing of parts made of synthetic resin, most commonly made of thermoplastic polymers. During a repetitive injection molding process, a plastic resin, most often in the form of small beads or pellets, is introduced to an injection molding machine that melts the resin beads under heat, pressure, and shear. The now-molten resin is forcefully injected into a mold cavity having a particular cavity shape. The injected plastic is held under pressure in the mold cavity, cooled, and then removed as a solidified part having a shape that essentially duplicates the cavity shape of the mold.

A typical injection molding procedure comprises four basic operations: (1) heating the plastic resin in the injection molding machine to allow it to flow under pressure; (2) injecting the melted plastic resin into a mold cavity or cavities defined between two mold halves that have been closed; (3) allowing the plastic resin to cool and harden in the cavity or cavities while under pressure; and (4) opening the mold halves to cause the cooled part to be ejected from the mold. In the conventional injection molding of synthetic resin by an injection molding machine, the weight of the injected synthetic resin varies with the molten resin pressure, the molten resin specific volume, the molten resin temperature and other molten resin conditions. Therefore, it is difficult to form products of a consistent quality.

In general, the setting of molding conditions of the injection molding machine requires a large number of trial molding operations and a lengthy setting time because the setting work greatly depends on the know-how and experience of an operator of the injection molding machine, and various physical values affect one another as well.

Therefore, a virtual molding, i.e., computer-implemented simulation, by use of CAE (Computer-Assisted Engineering) is performed for the injection molding, and the molding conditions are then set based on the virtual molding. In virtual molding by use of CAE, phenomena will occur in a mold cavity within a short period of time, i.e., the result of simulation on resin temperature, pressure, shear rate, etc. can be reflected in molded products. Therefore, if the molding phenomena occurring within a mold cavity can be accurately predicted, use of CAE may enable optimization of molding conditions and stable molding of non-defective products.

Figure 1:
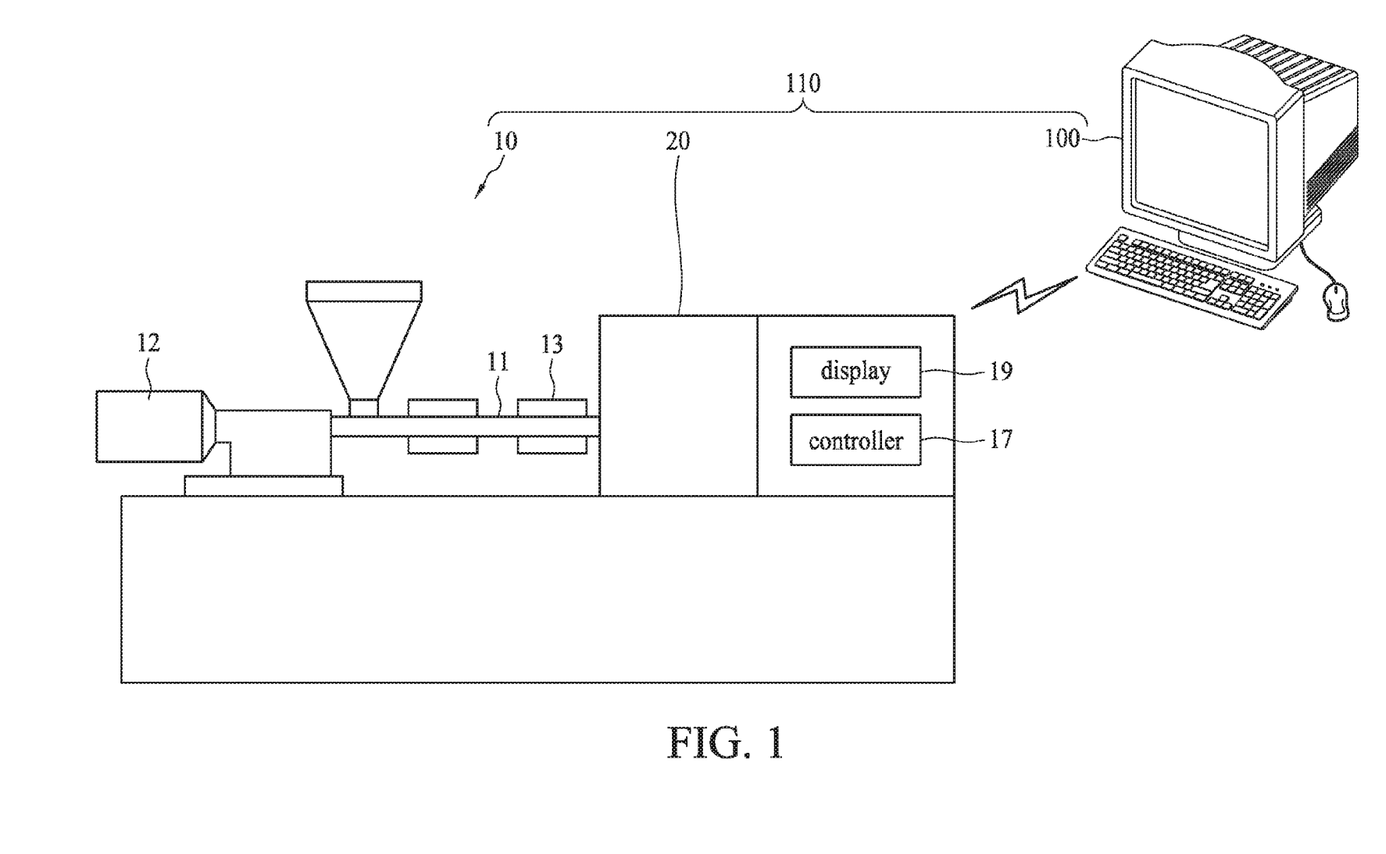
FIG. 1 is a schematic view of an injection molding system in accordance with various embodiments of the present disclosure.
Figure 2:
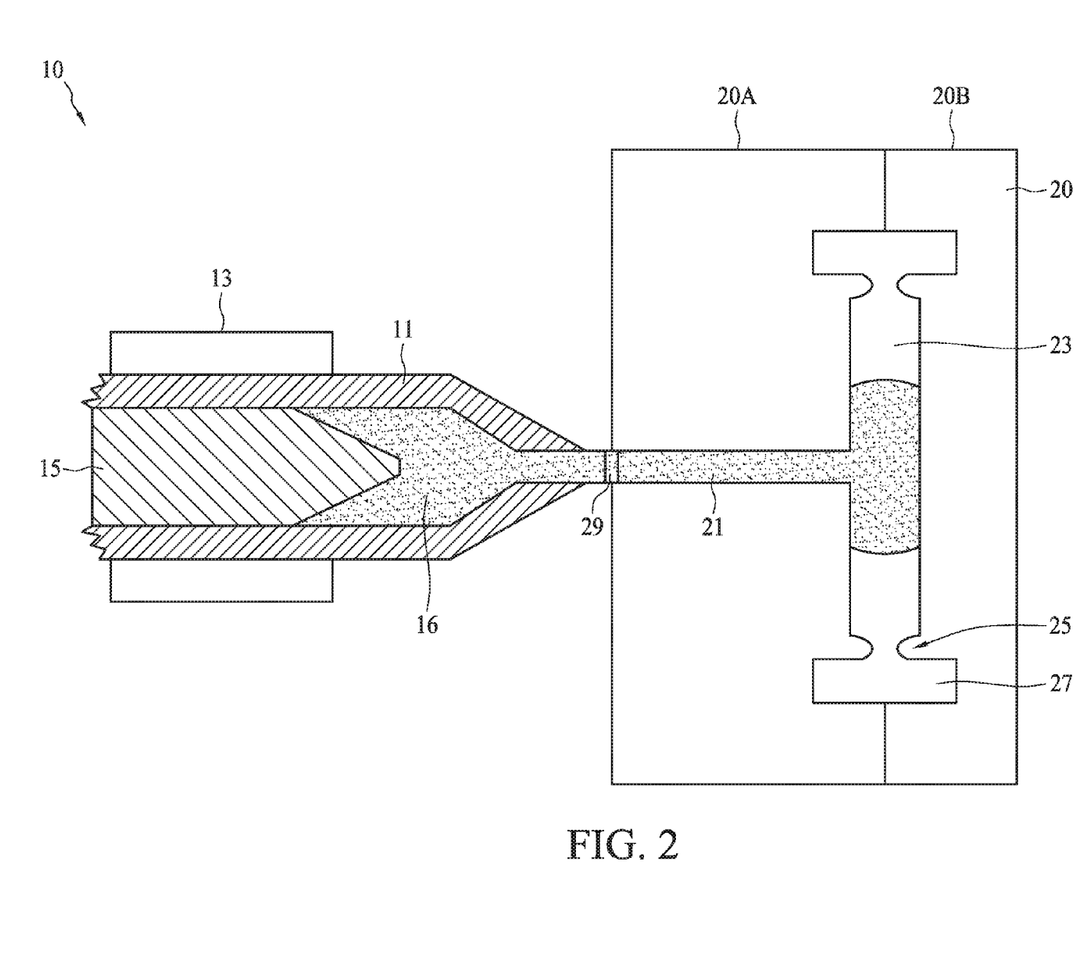
FIG. 2 is a close-up schematic view of the mold in FIG. 1.

FIG. 1 is a schematic view of an injection molding system 110 in accordance with various embodiments of the present disclosure, and FIG. 2 is a close-up schematic view of the mold 20 and the barrel 11 in FIG. 1. The injection molding system 110 comprises a molding machine 10 such as an injection molding machine, a mold 20 disposed on the molding machine 10, and a computing apparatus 100 connected to the injection molding machine 10. In some embodiments of the present disclosure, the injection molding machine 10 includes a barrel 11 having a screw chamber, heating elements 13 configured to heat the screw chamber of the barrel 11, and a screw 15 positioned in the screw chamber of the barrel 11 and driven by a screw-driving motor 12 for feeding a molding resin 16, such as thermoplastics, into a mold cavity 27 of the metal mold 20. In some embodiments of the present disclosure, the injection molding system 110 has a controller 17 configured to control the operation of the injection molding machine 10, and a display 19 configured to display information of the injection molding process. In some embodiments of the present disclosure, the controller 17 and the computing apparatus 100 implement a controlling module of the injection molding system 110.

In some embodiments of the present disclosure, the injection molding machine 10 is equipped with sensors for sensing the velocity of the screw 15, the pressure of the barrel 11 (the filling pressure in the filling stage and the packing pressure in the packing stage) and the temperature of the barrel 11 (the filling temperature in the filling stage and the packing temperature in the packing stage); and the computing apparatus 100 is programmed to acquire the velocity and pressure data from the controller 17 through the association therebetween.

The metal mold 20 is constituted by a fixed-side metal mold 20A and a movable-side metal mold 20B. Inside the metal mold 20, a sprue portion 21, a runner portion 23, a gate portion 25 and a mold cavity 27 are formed so as to be arranged in the above-mentioned order from the injection molding machine 10. The sprue portion 21 of the metal mold 20 is connected to the barrel 11 of the molding machine 10 via a nozzle 29.

The injection molding technique uses conventional rapid automated molding equipment, and short/long fiber reinforced thermoplastic (SFRT/LFRT) production is applied using the injection process. In the injection molding process, the additional fiber-filled polymer/resin melts (fibers in a matrix) are transported as a suspension into the mold cavity 27. To design molded FRT articles effectively, the influence of flow-induced fiber orientation distribution on the mechanical properties of the finished molding product, such as the strength of the finished molding product, must be considered.

FRT composites are generally grouped into two categories based on fiber length: short fiber-reinforced thermoplastics or SFRTs, with fiber length less than 1.0 mm, and long fiber-reinforced thermoplastics or LFRTs, having fiber length greater than 1.0 mm. Unlike SFRTs, LFRTs can yield continuous-fiber reinforcement. LFRT pellets are more extensively employed in automotive industrial fabrication than SFRT pellets.

Figure 3:
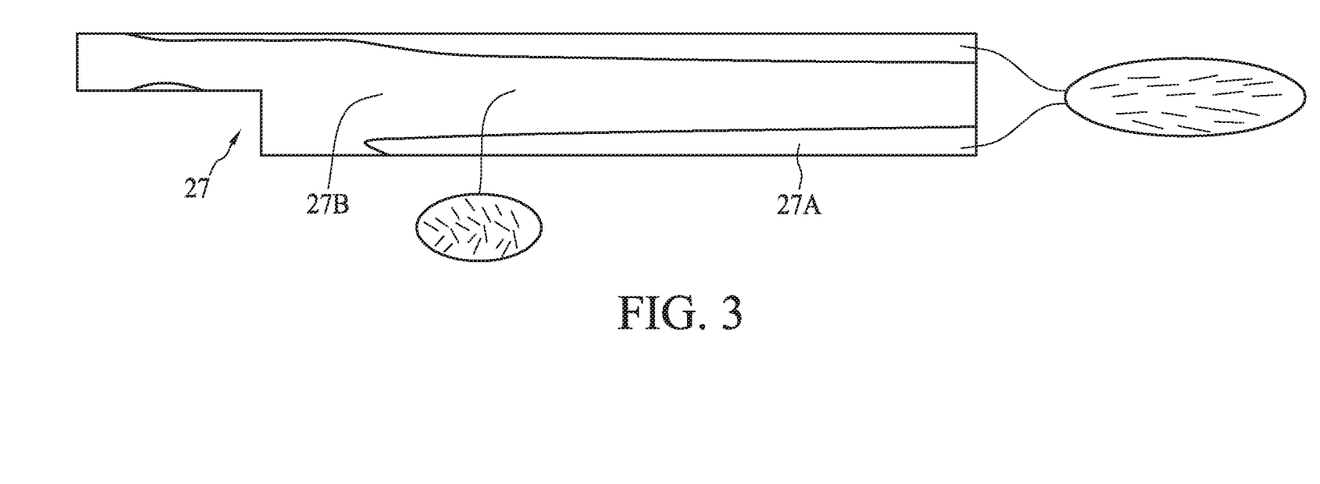
FIG. 3 illustrates the orientation of the fibers filled into the mold cavity in FIG. 2.

FIG. 3 illustrates the orientation of a composite molding resin (including a polymeric material having a plurality of fibers) filled into the mold cavity 27 in FIG. 2. The most noticeable feature of the filling is the existence of shell layers 27A and a core region 27B across the thickness of the molded cavity 27. The fibers found in the shell layers 27A (near the cavity wall) are strongly aligned in the flow direction, but the fibers in the core region 27B (near the cavity center) are transverse to the flow. Hence, it is necessary to understand how the fiber orientation varies during the mold filling and the subsequent packing stages. In some embodiments of the present disclosure, the polymeric material is PP (Polypropylene), PBT (Polybutylene terephthalate), nylon, or PC (Polycarbonate), the fibers are glass fibers or carbon fiber, and the fiber concentration in the polymeric material is between 10 wt %/o and 60 wt %.

Theoretical researches of fiber orientations are significant in the field of suspension rheology. The classical hydrodynamic model for a single axisymmetric fiber was proposed by the pioneer Jeffery. Folgar and Tucker modified Jeffery's model to include fiber-fiber interactions in semi-concentrated suspensions, which has been widely used to predict flow-induced fiber orientation patterns in injection-molded FRT articles. Recently, it is significant that both objective models of fiber orientation were developed in the field of suspension rheology, namely, RSC (Reduced Strain Closure) and iARD-RPR (Improved Anisotropic Rotary Diffusion and Retarding Principal Rate). The state-of-the-art predictive engineering tools of injection molding simulations, the Autodesk Simulation Moldflow Insight (ASMI) and the Moldex3D (CoreTech System Co. of Taiwan), have incorporated the RSC model and the iARD-RPR model, respectively, to provide predictions of fiber orientation.

Accurate orientation predictions of the modern RSC and iARD-RPR models are primary requirements in a complete simulation, from injection molding to structural analysis. However, some studies have found the weakness and flaw of RSC and iARD-RPR in which significant deviation was found in the core region, although the orientation in the shell layer was predicted fairly well. This is a long-running problem in the state-of-the-art predictive engineering tools.

Regarding this issue, an ASMI team provided an available function, "the 3D inlet condition of fiber orientation set around a gate area," to improve fiber orientation predictions using the RSC model in 3D-mesh analysis. Wang, et al. and Nguyen, et al. examined a new research version of the ASMI Fiber solver with the 3D inlet gate condition of fiber orientation distribution, supporting the user-defined model (if possessing experimental data) and the specified model (artificially, to define aligned orientation at the skin and transverse/random orientation at the core). It is noteworthy that they pointed out that the inlet condition strongly influences the prediction of the RSC model and the ARD-RSC model. Therefore, the good orientation predictions of long carbon fibers were achieved by comparing the midplane-mesh and 3D-mesh simulations with relevant experimental data.

Recently, the inventors of the present disclosure proposed an iARD-RPR model including three parts (See, U.S. Pat. No. 8,571,828; H.-C. Tseng, R.-Y. Chang, C.-H. Hsu, Phenomenological improvements to predictive models of fiber orientation in concentrated suspensions, J. Rheol., 57 (2013) 1597; H.-C. Tseng, R.-Y. Chang, C.-H. Hsu, An objective tensor to predict anisotropic fiber orientation in concentrated suspensions, J. Rheol., 60 (2016) 215; the entirety of which are incorporated herein by reference).

First, the iARD-RPR equation contains three terms: the Jeffery Hydrodynamics (HD) $\dot{A}^{HD}$, the iARD $\dot{A}^{iARD}$ and the RPR $\dot{A}^{RPR}$, presented as follows:

$$\dot{A} = \dot{A}^{HD} + \dot{A}^{iARD}(C_I, C_M) + \dot{A}^{RPR}(\alpha) \qquad (1)$$

$$\dot{A}^{HD} = (W \cdot A - A \cdot W) + \xi(D \cdot A + A \cdot D - 2A_4 : D) \quad (2)$$

A is the second order orientation tensor, representing the orientation distribution of the fibers; A time-evolution equation of the second-order orientation tensor Å is fixed on the material derivative; $A_4$ is a fourth order orientation tensor;

$$W = \frac{1}{2}(L - L^T)$$

is the vorticity tensor and $$D = \frac{1}{2}(L + L^T)$$

is the rate-of-deformation tensor, $L = \nabla v = W + D$ is the velocity gradient tensor with its component of $L_{ij} = \nabla_j u_i$, wherein $u_i$ is the component of the velocity in the $x_i$ direction. The superscript T is the transpose operator of a matrix throughout this paper; $\dot{\gamma}$ is the shear rate of D, $$\dot{\gamma} = \sqrt{2D:D}.$$

$\xi = (a_r^2 - 1)/(a_r^2 + 1)$ is the shape factor, and $a_r$ is the fiber aspect ratio, i.e., the ratio of fiber length l to fiber diameter d, $a_r = l/d$.

$\dot{A}^{iARD}(C_I, C_M)$ has two parameters: the fiber-fiber interaction parameter $C_I$ and the fiber-matrix (fiber-polymer) interaction parameter $C_M$; $\dot{A}^{RPR}(\alpha)$ has one parameter $\alpha$, which is meant to slow down a quicker response rate of the fiber movement.

Second, it is significant that the rotary diffusion tensor $D_r$ depends on the square of the objective rate-of-deformation tensor for defining a new iARD model, as below:

$$\dot{A}^{iARD} = \dot{\gamma}[2D_r - 2tr(D_r)A - 5D_r \cdot A - 5A \cdot D_r + 10A_4 : D_r] \quad (3)$$

$$D_r = C_I \left( I - C_M \frac{D^2}{\|D^2\|} \right)$$

D is the rate-of-deformation tensor, which is the symmetric part of the velocity-gradient tensor $$L, D = \frac{1}{2}(L^T + L).$$

The scalar $$\|D^2\| = \sqrt{\frac{1}{2}D^2 : D^2}$$

is the norm of tensor $D^2$. In particular, the rotary diffusion tensor $D_r$ depends on the fiber-matrix (fiber-polymer) interaction parameter $C_M$, and is independent of the fiber's orientation distribution A.

Lastly, the RPR model is introduced as follows:

$$\dot{A}^{RPR} = -R \cdot \dot{\Lambda}^{IOK} \cdot R^T \quad (4)$$

$$\dot{\Lambda}_{ii}^{IOK} = \alpha \dot{\lambda}_i, \ i,j,k=1,2,3 \quad (5)$$

Where $\dot{\Lambda}^{IOK}$ is the material derivative of a particular diagonal tensor and its superscript indicates the intrinsic orientation kinetics (IOK) assumption (see, Tseng, H.-C., R.-Y. Chang, and C.-H. Hsu, "Method and Computer Readable Media for Determining Orientation of Fibers in a Fluid," U.S. Pat. No. 8,571,828 (2013) and Tseng, H.-C., R.-Y. Chang, and C.-H. Hsu, "Phenomenological Improvements to Predictive Models of Fiber Orientation in Concentrated Suspensions" J Rheol 57 1597-1631 (2013); the entirety of which is incorporated herein by reference); R is the rotation matrix and $R^T$ is the transpose of R; the superscript T is the transpose operator of a matrix throughout this paper; $\lambda_i$ is the eigenvalues of A, $\lambda_1 \geq \lambda_2 \geq \lambda_3$; and $R = [e_1, e_2, e_3]$ is defined by eigenvector columns of A. This rotation matrix is also an orthogonal matrix, $R \cdot R^T = R^T \cdot R = I$, where I is the identity matrix.

Fan et al. proposed an isotropic rotary diffusion tensor for the Folgar-Tucker constant $C_I$ (see, Fan, X., N. Phan-Thien, and R. Zheng, "A Direct Simulation of Fibre Suspensions" J Non-Newtonian Fluid Mech 74 113-135 (1998); the entirety of which is incorporated herein by reference), as follows:

$$D_r = C_I I = C_I \begin{bmatrix} 1 & 0 & 0 \\ 0 & 1 & 0 \\ 0 & 0 & 1 \end{bmatrix} \quad (6)$$

Where three diagonal components equal one and their physical meaning is the probability ratio of the fibers lying along Cartesian coordinates; thus, the probability in the ratio is the same value at each axis for the isotropic orientation distribution.

The physical interpretation of the rotary diffusion tensor $D_r$ is very similar to that of the orientation tensor A. The principal directions of the rotary diffusion tensor $D_r$ are numbered in the order of the respective principal values, from the largest to the smallest. The first principal direction represents the direction along which the most fibers are aligned, and the third principal direction represents the one along which the fewest fibers are aligned. The larger principal value indicates a stronger alignment in the corresponding principal direction. When three principal components are the same larger value, the tensor is the identity matrix, namely, the isotropic rotary diffusion tensor.

In the present application, the rotary diffusion tensor $D_r$ is independent upon the tensor A. Based on the rotation matrix R of the orientation tensor A, a principal form of the anisotropic rotary diffusion tensor $D_r$ is newly introduced as follows:

$$D_r = C_I R \cdot \hat{d}_r \cdot R^T \quad (7)$$

$$\hat{d}_r = \begin{bmatrix} d_1 & 0 & 0 \\ 0 & d_2 & 0 \\ 0 & 0 & d_3 \end{bmatrix} \quad (8)$$

where $\hat{d}_r$ is the principal tensor of anisotropic rotary diffusion with three diagonal components $d_1$, $d_2$, $d_3$, ($0 \leq d_3 \leq d_2 \leq d_1 \leq 1$) limited between 0 and 1; the rotation matrix $R = [e_1, e_2, e_3]$ is defined by eigenvector columns of the orientation tensor A. Such a new diagonal tensor $\hat{d}_r$ is called the principal anisotropic rotary diffusion (pARD). When $d_1=d_2=d_3=1$ or the principal matrix $\hat{d}_r$ equals the identity matrix, the anisotropic rotary diffusion tensor $D_r$ in Eq. (7) becomes the isotropic rotary diffusion tensor in Eq. (6). Physically, the components, $d_1$, $d_2$, $d_3$, indicate the probability ratio of the fibers lying along the principal vectors of fiber orientation tensor for the fibers in the composite molding resin. In particular, the rotary diffusion tensor $D_r$ in Eq. (7) is independent of the fiber-matrix (fiber-polymer) interaction ($C_M$) and the rate-of-deformation tensor (D), and indirectly depend on the fiber's orientation distribution A through the rotation matrix $R=[e_1, e_2, e_3]$, which is defined by eigenvector columns of the orientation tensor A. Furthermore, the fiber's orientation distribution (the orientation tensor A) is generated from the Jeffery Hydrodynamics (HD) $\dot{A}^{HD}$, which is related to the molding condition of the molding machine via the vorticity tensor (W) and the rate-of-deformation tensor (D).

In some embodiments of the present disclosure, the fiber's orientation distribution (the orientation tensor A) is generated using a constant fiber-fiber interaction ($C_I$), which is independent of a shear rate distribution ($\dot{\gamma}$) of the composite molding resin in the mold cavity. In some embodiments of the present disclosure, the rate-of-deformation tensor (D) is derived from the velocity distribution of the composite molding resin in the mold cavity, and the rotary diffusion tensor $D_r$ in Eq. (7) is independent of the rate-of-deformation tensor (D); therefore, the rotary diffusional distribution of the fibers is independent of the velocity distribution of the composite molding resin in the mold cavity.

In some embodiments of the present disclosure, the tensor $\hat{d}_r$ in Eq. (8) is simplified through one parameter n and the limitation $0 \leq d_3 \leq d_2 \leq d_1 \leq 1$:

$$\hat{d}_r = \begin{bmatrix} 1 & 0 & 0 \\ 0 & \Omega & 0 \\ 0 & 0 & 1-\Omega \end{bmatrix} \quad (9)$$

Where $d_1=1$, $d_2=\Omega$, and $d_3=1-\Omega$; $\Omega$ is a constant, $0.5 \leq \Omega \leq 1$.

In summary, the present disclosure uses the expression of the rotary diffusion tensor $D_r$ in Eq. (7) to update the $D_r$ in Eq. (3), and the updated model is called the pARD model $\dot{A}^{pARD}$, wherein the rotary diffusional distribution of the fibers is independent of the fiber-polymer interaction ($C_M$). The pARD model coupled with $\dot{A}^{HD}$ and $\dot{A}^{RPR}$ for the time-evolution equation of the orientation tensor becomes the following:

$$\dot{A} = \dot{A}^{HD} + \dot{A}^{pARD}(C_I, \Omega) + \dot{A}^{RPR}(\alpha) \quad (10)$$

$$\dot{A}^{pARD} = \dot{\gamma}[2D_r - 2tr(D_r)A - 5D_r \cdot A - 5A \cdot D_r + 10A_4 : D_r]$$

$$D_r = C_I R \cdot \hat{d}_r \cdot R^T \quad (11)$$

The pARD-RPR model is now available to predict the anisotropic fiber orientation distributions of the fibers in injection molding simulations for preparing an injection-molded fiber-reinforced composite article.

Figure 4:
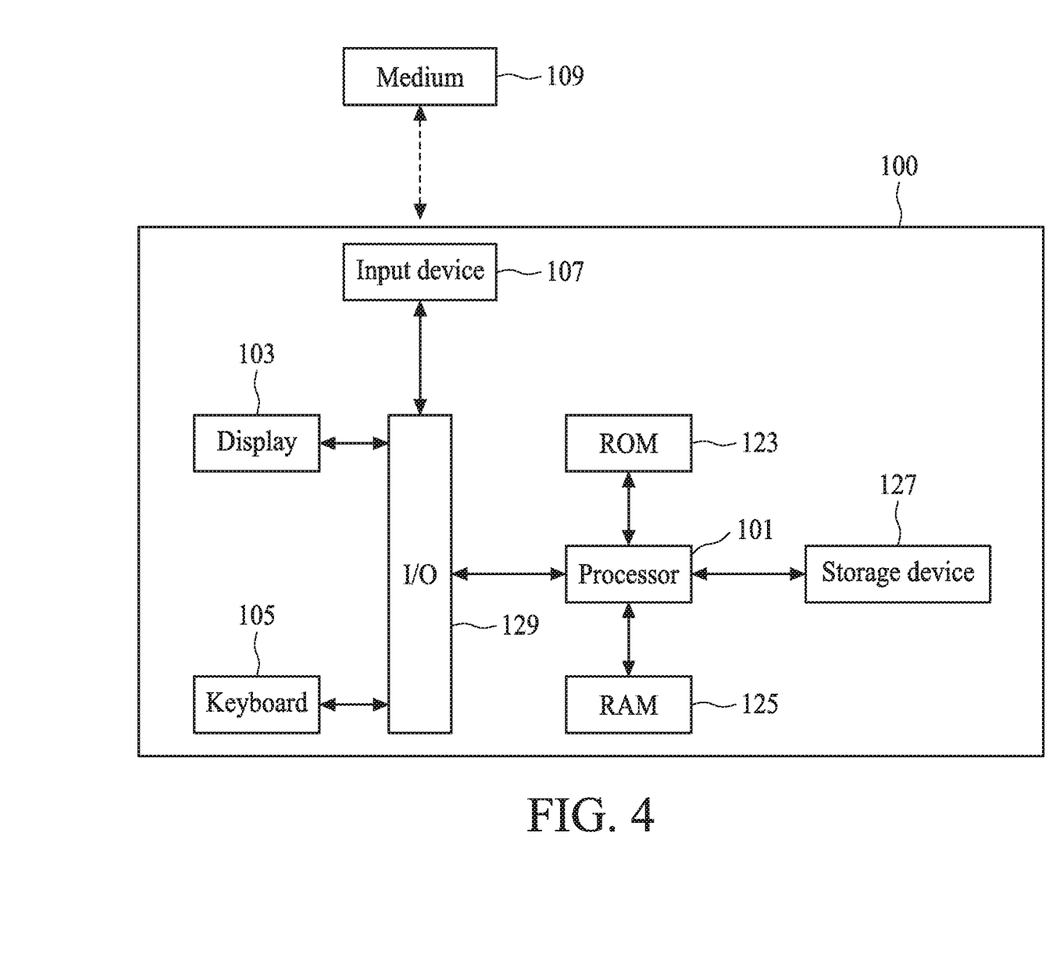
FIG. 4 is a functional block diagram of a computing apparatus in accordance with some embodiments of the present disclosure.

FIG. 4 is a functional block diagram of the computing apparatus 100 in accordance with some embodiments of the present disclosure. In some embodiments of the present disclosure, the computing apparatus 100 comprises a computer processor 101 for performing a computer-implemented injection molding method. In some embodiments of the present disclosure, the computing apparatus 100 includes a read-only memory (ROM) 123, a random access memory (RAM) 125, a storage device 127, and an input/output (I/O) interface 129. The computer processor 101 operably communicates with the ROM 123, the RAM 125, the storage device 127, and the I/O interface 129.

In some embodiments of the present disclosure, the computing apparatus 100 may further include a display 103, a keyboard 105, and an input device 107, such as a card reader or an optical disk drive. The input device 107 is configured to input computer instructions (software algorithms) stored in a non-transitory computer-readable medium 109, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125. In some embodiments of the present disclosure, the memory devices, i.e., the ROM 123 and the RAM 125, can be programmed to store codes for performing the computer-implemented method.

Figure 5:
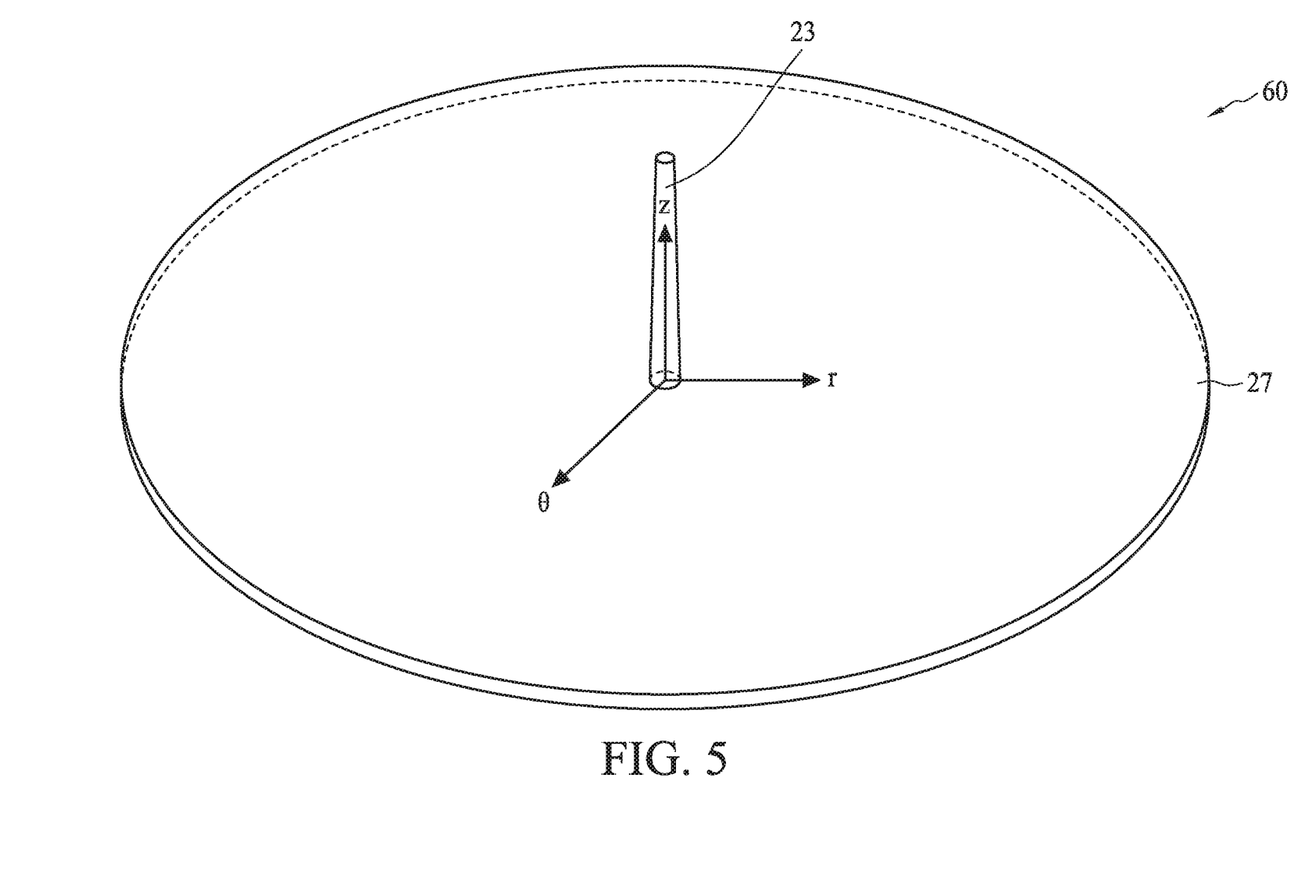
FIG. 5 shows a genuine domain of an FRT composite article with a center-gated disk geometry.

FIG. 5 is a schematic view of a genuine domain 60 in accordance with some embodiments of the present disclosure. Referring back to FIG. 2, the metal mold 20 may be divided into two parts: a metal part and a space part defined by the metal part. The genuine domain 60 is an example of the space part of the metal mold 20.

Figure 6:
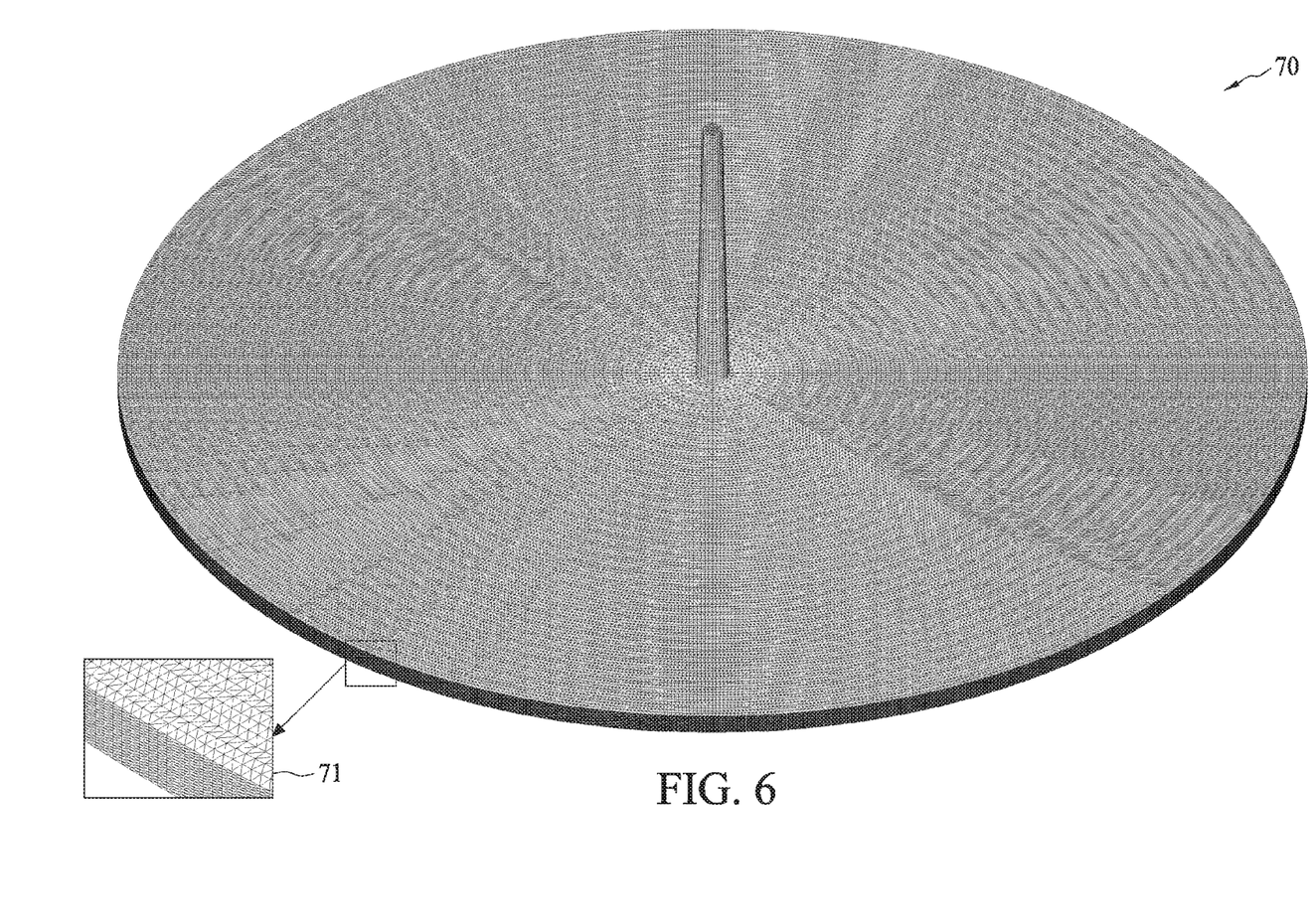
FIG. 6 is a schematic view of a simulating domain corresponding to the genuine domain in accordance with some embodiments of the present disclosure.

FIG. 6 is a schematic view of a simulating domain 70 corresponding to the genuine domain 60 in accordance with some embodiments of the present disclosure. In some embodiments of the present disclosure, a mesh is created by dividing at least part of the simulating domain 70 before actually applying a numerical analysis, such as an FEM (finite element method), an FDM (finite difference method) or an FVM (finite volume method), to the simulating domain 70. The creation of the mesh for the simulating domain 70 uses a technique of modeling an object or fluid (composite molding resin) region (i.e., the simulating domain 70 of the present embodiment) to be analyzed with a set of elements 71, such as rectangular mesh, hexahedral mesh or tetrahedral mesh, in order to perform the subsequent numerical analysis. In some embodiments of the present disclosure, the simulating domain is obtained from a CAD (Computer Aided Design) model used in design and development of a product.

After specifying the simulation domain 70, the processor 101 is executed to generate a shear rate distribution of the composite molding resin in the simulating domain 70. A virtual molding process is performed to simulate a molding process of the composite molding resin that is injected into the simulating domain 70 while using a molding condition for the molding machine, wherein the molding condition includes the mold temperature, resin temperature, injection pressure, injection time (or speed), packing pressure, packing time, etc. The molding phenomena of the molding material 16 can be simulated using the following governing equations (12)-(15):

$$\frac{\partial \rho}{\partial t} + \nabla \cdot \rho u = 0 \quad (12)$$

$$\frac{\partial}{\partial t}(\rho u) + \nabla \cdot (\rho u u + \tau) = -\nabla p + \rho g \quad (13)$$

$$\frac{\partial}{\partial t}(T \rho C_p) + \nabla \cdot (\rho u C_p T) = k \nabla^2 T + \eta \dot{\gamma}^2 \quad (14)$$

-continued $$\tau = -\eta(T, \dot{\gamma})(\nabla u + \nabla u^T) \quad (15)$$

where ρ represents the density, t represents the time, u represents the velocity vector (flow velocity), τ represents the total stress tensor, p represents the pressure, g represents the gravity vector, T represents the temperature, $C_P$ represents the specific heat, k represents the thermal conductivity, η represents the viscosity, and $\dot{\gamma}$ represents the shear rate.

Solving the governing equations (12)-(15) require a transient state analysis, which can be performed numerically using a computer. See, for example, Rong-yeu Chang and Wen-hsien Yang, "Numerical simulation of mold filling in injection molding using a three-dimensional finite volume approach", International Journal for Numerical Methods in Fluids Volume 37, Issue 2, pages 125-148, Sep. 30, 2001, the entirety of which is incorporated herein by reference. During the transient state analysis, the process variables that change with time are not zero; i.e., the partial derivatives (∂/∂t) in the governing equations (12)-(15) are not considered zero.

Figure 7:
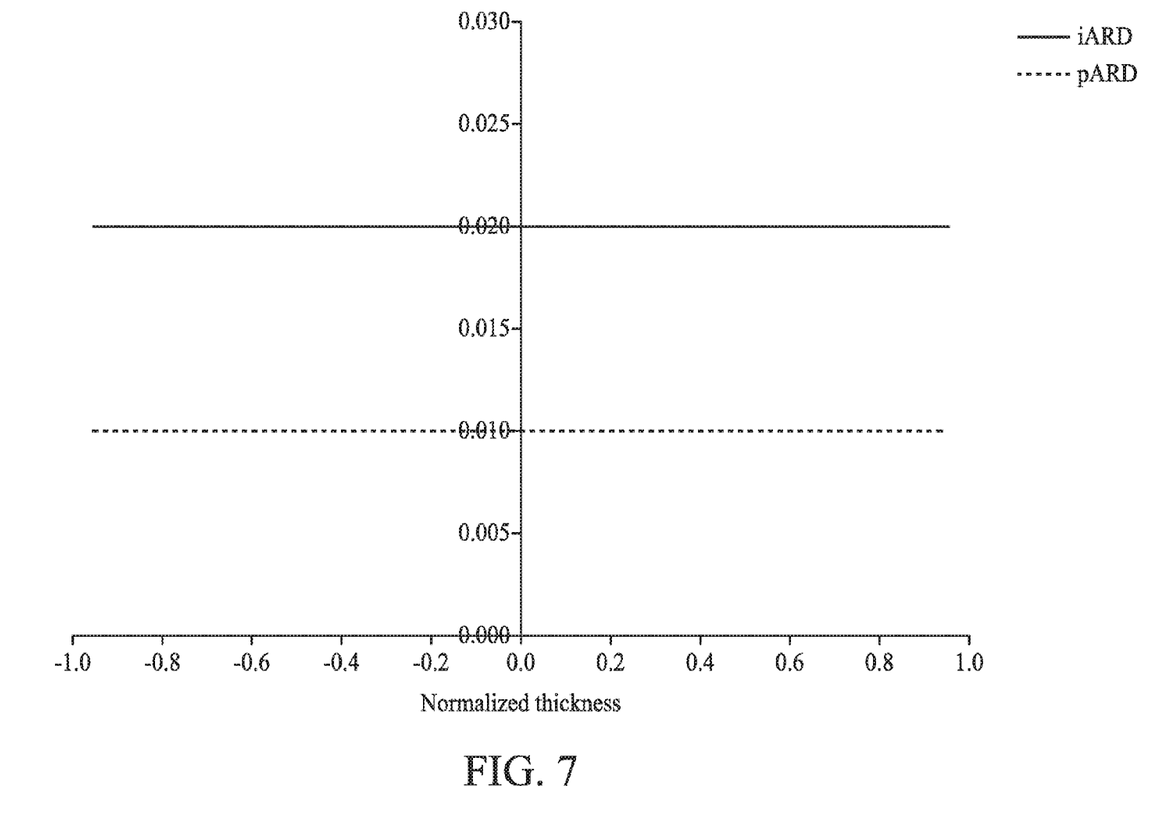
FIG. 7 shows the principal form of the anisotropic rotary diffusion tensor $D_r$ in accordance with the present embodiment (pARD) and a comparative embodiment (iARD) of the present disclosure, respectively.
Figure 8:
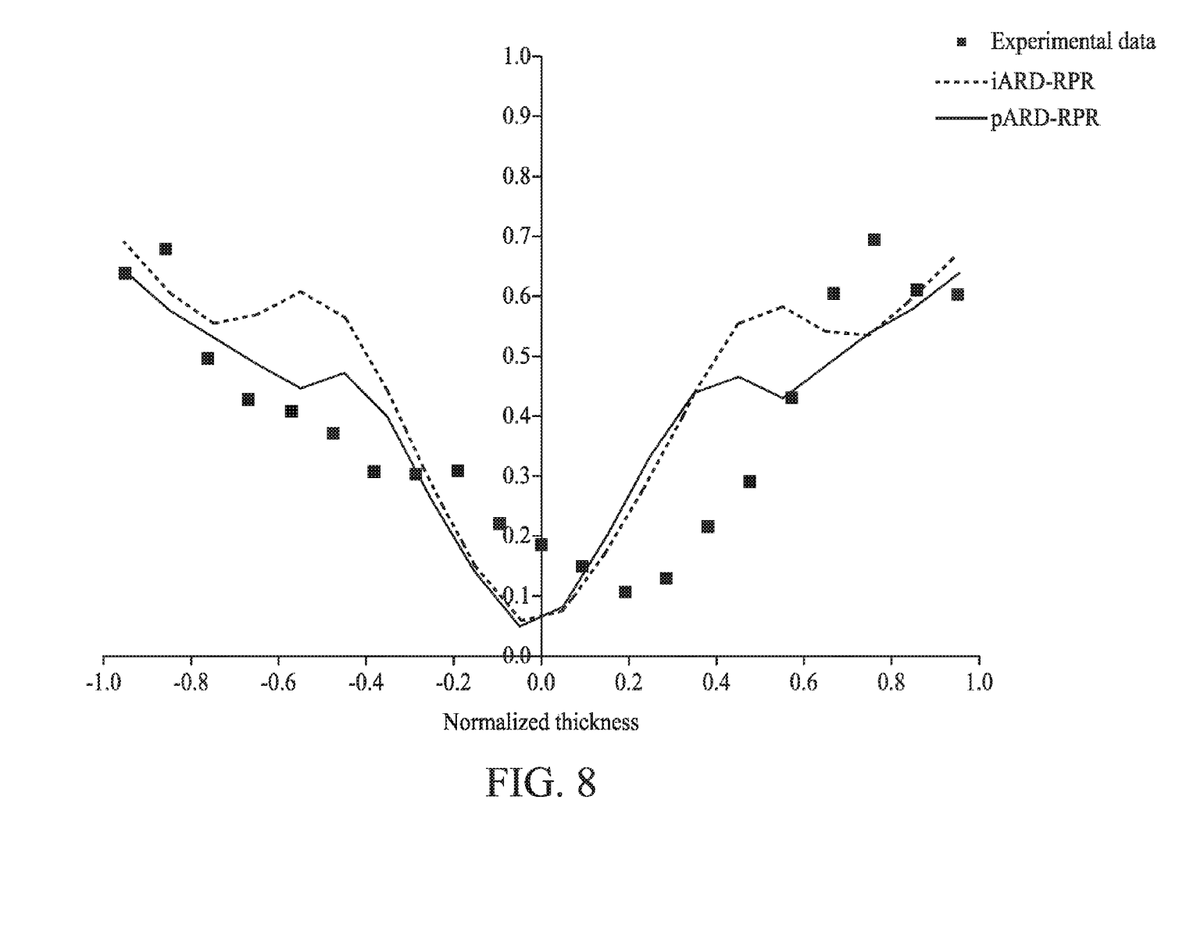
FIG. 8 show the experimental and predicted fiber orientation distributions (A11) across the thickness of the molded composite article in FIG. 5 in accordance with present embodiment (pARD-RPR) and the comparative embodiment (iARD-RPR) of the present disclosure, respectively.

FIG. 7 shows the principal form of the anisotropic rotary diffusion tensor $D_r$ in accordance with the present embodiment (pARD) and a comparative embodiment (iARD) of the present disclosure, respectively. FIG. 8 shows the experimental and predicted fiber orientation distributions (A11) across the thickness of the molded composite article in FIG. 5 in accordance with present embodiment (pARD-RPR) and the comparative embodiment (iARD-RPR) of the present disclosure, respectively.

Determining an accurate prediction long fiber orientation in true 3D simulations of injection molding is challenging. The comparative embodiments are reported in the U.S. by the Pacific Northwest National Laboratory (PNNL) and the Oak Ridge National Laboratory (ORNL) (See, Nguyen, N., X. Jin, J. Wang, J. H. Phelps, C. L. Tucker m, V. Kunc, S. K. Bapanapalli, and M. T. Smith, "Implementation of New Process Models for Tailored Polymer Composite Structures into Processing Software Packages" the US Department of Energy, Pacific Northwest National Laboratory, PNNL Report under Contract DE-AC05-76RL01830 PNNL-19185 (2010); the entirety of which is incorporated herein by reference). In FIG. 5, the disk is about 90 mm in radius with a gap thickness of 2 h=3 mm. One measurement point is located at 34 mm in the radial direction. The mold and melting temperatures were set at 70° C. and 238° C., respectively. The filling time and volume flow rate were 0.59 sec and 130 cc/sec, respectively. The experimental material is the 40 wt % long glass-fiber immersed in polypropylene matrix (40 wt % LGF/PP). The iARD-RPR and pARD-RPR models have been integrated into a commercial injection molding simulation software, Moldex3D. Note that in Moldex3D, the previous inlet condition of the orientation tensor at the runner entrance was set as the isotropic state. Two parameters of the anisotropic rotary diffusion tensor models are addressed in Table 1, and the same value of the RPR parameter is set: α=0.1.

TABLE 1

Parameters of anisotropic rotary diffusion tensor

| iARD model | | pARD model | |
|---|---|---|---|
| $C_I$ | 0.01 | $C_I$ | 0.01 |
| $C_M$ | 1.0 | Ω | 1.0 |

The carefully extracted experimental data on fiber orientation can be referred to the PNNL-ORNL report. The fiber orientation component, A11, corresponds to the flow direction. The iARD tensor in Eq. (3) and the pARD tensor in Eq. (11) are obviously different in the definition. In the embodiments in Table 1, to show difference of the pARD tensor in Eq. (11) from the iARD tensor in Eq. (3), the pARD parameter (Ω) in Eq. (11) is intentionally set at the same value as the iARD parameter ($C_M$) in Eq. (3).

In some embodiments of the present disclosure, the rotary diffusional distribution of the fibers is generated by the processor based on the inter-fiber interaction ($C_I$), which is independent of a shear rate distribution of the composite molding resin in the mold cavity. In some embodiments of the present disclosure, the rotary diffusional distribution of the fibers is generated by the processor based on a constant inter-fiber interaction. As a whole, the iARD-RPR and pARD-RPR predictions for fiber orientation distribution in the core region and the shell layers agreed fairly well with the PNNL-ORNL results of experimental orientation data.

The standard deviation (SD) in statistics is adopted to quantify the amount of dispersion for a set of the predicted orientation values $A_i^P$ with number of samples N, corresponding to experimental data $A_i^E$, as below:

$$SD = \sqrt{\frac{\sum_{i=1}^{N}(A_i^P - A_i^E)^2}{N}} \quad (16)$$

Consequently, the standard deviations for the iARD-RPR model and the pARD-RPR model are evaluated in Table 2. In addition, the thickness-averaged A11 value is addressed in Table 3, wherein the thickness-average experimental data is 0.3895. Clearly, the pARD-RPR model of the present disclosure is superior to the comparative iARD-RPR model. Therefore, the newly developed model of the pARD tensor is demonstrated to be more valuable to predict transient, anisotropic flow-induced orientation of the fibers in the composite molding article.

TABLE 2

Standard deviation (SD) in statistics to quantify the amount of dispersion for predictions of the iARD-RPR and the pARD-RPR models, as compared with experimental data.

| Model | Standard Deviation (SD) |
|---|---|
| iARD-RPR | 0.1441 |
| pARD-RPR | 0.1167 |

TABLE 3

Relative errors of thickness-average orientation for predictions of the iARD-RPR and the pARD-RPR models, as compared with the thickness-average experimental data (0.3895).

| Model | Thickness-average | Relative error (%) |
|---|---|---|
| iARD-RPR | 0.4501 | 15.5 |
| pARD-RPR | 0.4101 | 5.3 |

In practice, mechanical performance depends on the fiber orientation state, including perfect alignment and random distribution, with a partial alignment representing a combination of perfect alignment and random distribution. For this reason, an integrative simulation is performed to determine the mechanical properties with respect to the fiber orientation state. A micromechanical material modeling software, Digimat-MF, based on the Mori-Tanaka Mean Field homogenization scheme, was used to calculate the mechanical properties of the FRT composites through inputting the fiber properties, wherein the fiber orientation state could be fixed, random or described by a second-order orientation tensor as predicted by injection-molding software, or measured experimentally.

Figure 9:
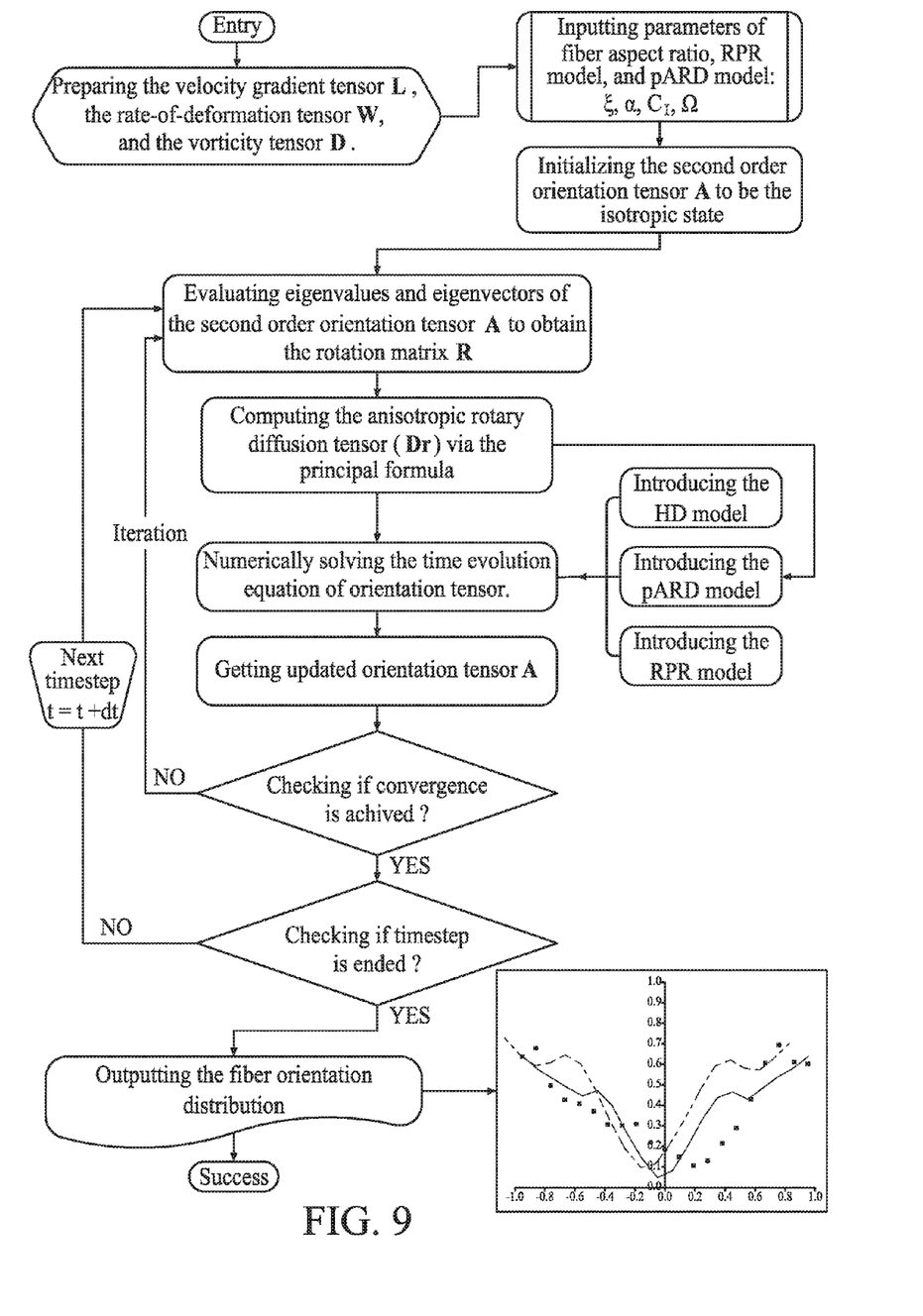
FIG. 9 is a flowchart showing an integration of the fiber orientation prediction technique and the CAE software in accordance with some embodiments of the present disclosure.

FIG. 9 is a flowchart showing an integration of the fiber orientation prediction technique and the CAE software in accordance with some embodiments of the present disclosure. In some embodiment of the present disclosure, the initial second order orientation tensor A (a previous orientation distribution of the fibers for the following operation) is isotropic, i.e., independent of a shear rate distribution of the composite molding resin in the mold cavity.

The CAE software for injection molding can offer a velocity gradient tensor in the filling flow field for the subsequent fiber-orientation analysis (see U.S. patent application Ser. No. 15/449,436; the entirety of which is incorporated herein by reference). Thus, the orientation analysis is able to determine an acceptable orientation tensor. It is important that the constitutive equation for fibers obtains the orientation tensor to calculate the fiber suspension stress tensor. In the next step, this stress tensor is returned to the CAE software for updating. Therefore, in future work, the embodiment of the fiber orientation program will play an important role and is helpful in present CAE development of injection molding for fiber reinforced composites.

The mechanical property of the molded article is correlated with the orientation distribution of the fibers. If the simulated orientation distribution of the fibers with the corresponding mechanical property does not meet the specification of the molded FRT article, the fiber parameters and/or the molding condition may be adjusted, and another simulation is performed to obtain an updated orientation distribution of the fibers in the composite molding resin while using the adjusted fiber parameter and/or the molding condition. To obtain the orientation distribution of the fibers in the composite molding resin injected into the model cavity, the present disclosure generates the rotary diffusional distribution of the fibers based on the previous orientation distribution of the fibers, and generates the updated orientation distribution of the fibers based on the rotary diffusional distribution of the fibers. Consequently, the present disclosure can accurately and efficiently predict the orientation distribution of the fibers in the composite molding resin and the mechanical property of the molded FRT article.

One aspect of the present disclosure provides a molding system for preparing an injection-molded fiber-reinforced composite article. In some embodiments of the present disclosure, the molding system comprises a mold having a mold cavity; a molding machine configured to fill the mold cavity with a composite molding resin including a polymeric material having a plurality of fibers; a computing apparatus connected to the molding machine; and a controller connected to the computing apparatus. In some embodiments of the present disclosure, the computing apparatus includes a processor configured to generate a previous orientation distribution of the fibers in the mold cavity based on a molding condition for the molding machine, a rotary diffusional distribution of the fibers based on the previous orientation distribution of the fibers, and an updated orientation distribution of the fibers based on the rotary diffusional distribution of the fibers. In some embodiments of the present disclosure, the controller is configured to control the molding machine to perform an actual molding with the molding condition for injecting the composite molding resin into at least a portion of the mold cavity.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A molding system for preparing an injection-molded fiber-reinforced composite article, comprising:
   a mold having a mold cavity;
   a molding machine configured to fill the mold cavity with a composite molding resin including a polymeric material having a plurality of fibers;
   a computing apparatus connected to the molding machine, wherein the computing apparatus is configured to generate a previous orientation distribution of the fibers in the mold cavity based on a molding condition for the molding machine, a rotary diffusional distribution of the fibers based on the previous orientation distribution of the fibers, and an updated orientation distribution of the fibers based on the rotary diffusional distribution of the fibers; and
   a controller connected to the computing apparatus and configured to control the molding machine with the molding condition to perform an actual molding for injecting the composite molding resin into at least a portion of the mold cavity;
   wherein the rotary diffusional distribution of the fibers is independent of a fiber-polymer interaction.

2. The molding system of claim 1, wherein the previous orientation distribution of the fibers is independent of a shear rate distribution of the composite molding resin in the mold cavity.

3. The molding system of claim 1, wherein the rotary diffusional distribution of the fibers is represented using an expression:

$$D_r = C_I R \hat{d}_r R^T$$

$$R = [e_1, e_2, e_3]$$

$$\hat{d}_r = \begin{bmatrix} d_1 & 0 & 0 \\ 0 & d_2 & 0 \\ 0 & 0 & d_3 \end{bmatrix}$$

where $C_I$ represents an inter-fiber interaction, $D_r$ represents the rotary diffusional distribution of the fibers, R represents eigenvalues of the previous orientation distribution of the fibers, $R^T$ represents a transpose of R, and $d_1$, $d_2$, $d_3$ represents probability ratios of the fibers lying along three orthogonal directions.

4. The molding system of claim 3, wherein the processor is also configured to generate an updated rotary diffusional distribution of the fibers based on the updated orientation distribution of the fibers.

5. The molding system of claim 4, wherein an effect of a shear rate distribution of the composite molding resin to the updated rotary diffusional distribution of the fibers is introduced through the updated orientation distribution.

6. The molding system of claim 4, wherein the processor is further configured to generate updated eigenvalues of the updated orientation distribution of the fibers.

7. The molding system of claim 3, wherein the processor is configured to generate the rotary diffusional distribution of the fibers based on the inter-fiber interaction, which is independent of a shear rate distribution of the composite molding resin in the mold cavity.

8. The molding system of claim 3, wherein the processor is configured to generate the rotary diffusional distribution of the fibers based on a constant inter-fiber interaction.

9. The molding system of claim 1, wherein the rotary diffusional distribution of the fibers is represented using an expression:

$$D_r = C_I R \hat{d}_r R^T$$

$$\hat{d}_r = \begin{bmatrix} 1 & 0 & 0 \\ 0 & \Omega & 0 \\ 0 & 0 & 1-\Omega \end{bmatrix}$$

where $C_I$ represents an inter-fiber interaction, $D_r$ represents the rotary diffusional distribution of the fibers, R represents eigenvalues of the previous orientation distribution of the fibers, $R^T$ represents a transpose of R, $\Omega$ is a constant, and $0.5 \leq \Omega \leq 1$.

10. The molding system of claim 9, wherein the processor is also configured to generate an updated rotary diffusional distribution of the fibers based on the updated orientation distribution of the fibers.

11. The molding system of claim 10, wherein an effect of a shear rate distribution of the composite molding resin to the updated rotary diffusional distribution of the fibers is introduced through the updated orientation distribution.

12. The molding system of claim 10, wherein the processor is further configured to generate updated eigenvalues of the updated orientation distribution of the fibers.

13. The molding system of claim 9, wherein the processor is configured to generate the rotary diffusional distribution of the fibers based on the inter-fiber interaction, which is independent of a shear rate distribution of the composite molding resin in the mold cavity.

14. The molding system of claim 9, wherein the processor is configured to generate the rotary diffusional distribution of the fibers based on a constant inter-fiber interaction.

15. The molding system of claim 1, wherein the rotary diffusional distribution of the fibers is independent of a velocity distribution of the composite molding resin in the mold cavity.

16. A molding system for preparing an injection-molded fiber-reinforced composite article, comprising:

a mold having a mold cavity;
a molding machine configured to fill the mold cavity with a composite molding resin including a polymeric material having a plurality of fibers;
a computing apparatus connected to the molding machine, wherein the computing apparatus is configured to generate a previous orientation distribution of the fibers in the mold cavity based on a molding condition for the molding machine, a rotary diffusional distribution of the fibers based on the previous orientation distribution of the fibers, and an updated orientation distribution of the fibers based on the rotary diffusional distribution of the fibers; and
a controller connected to the computing apparatus and configured to control the molding machine with the molding condition to perform an actual molding for injecting the composite molding resin into at least a portion of the mold cavity;
wherein the rotary diffusional distribution of the fibers is represented using an expression:

$$D_r = C_I R \hat{d}_r R^T$$

$$R = [e_1, e_2, e_3]$$

$$\hat{d}_r = \begin{bmatrix} d_1 & 0 & 0 \\ 0 & d_2 & 0 \\ 0 & 0 & d_3 \end{bmatrix}$$

where $C_I$ represents an inter-fiber interaction, $D_r$ represents the rotary diffusional distribution of the fibers, R represents eigenvalues of the previous orientation distribution of the fibers, $R^T$ represents a transpose of R, and $d_1$, $d_2$, $d_3$ represents probability ratios of the fibers lying along three orthogonal directions.

17. The molding system of claim 16, wherein the processor is also configured to generate an updated rotary diffusional distribution of the fibers based on the updated orientation distribution of the fibers.

18. The molding system of claim 17, wherein an effect of a shear rate distribution of the composite molding resin to the updated rotary diffusional distribution of the fibers is introduced through the updated orientation distribution.

19. The molding system of claim 17, wherein the processor is further configured to generate updated eigenvalues of the updated orientation distribution of the fibers.

20. The molding system of claim 16, wherein the processor is configured to generate the rotary diffusional distribution of the fibers based on the inter-fiber interaction, which is independent of a shear rate distribution of the composite molding resin in the mold cavity.

21. The molding system of claim 16, wherein the processor is configured to generate the rotary diffusional distribution of the fibers based on a constant inter-fiber interaction.

22. A molding system for preparing an injection-molded fiber-reinforced composite article, comprising:

a mold having a mold cavity;
a molding machine configured to fill the mold cavity with a composite molding resin including a polymeric material having a plurality of fibers;
a computing apparatus connected to the molding machine, wherein the computing apparatus is configured to generate a previous orientation distribution of the fibers in the mold cavity based on a molding condition for the molding machine, a rotary diffusional distribution of the fibers based on the previous orientation distribution of the fibers, and an updated orientation distribution of the fibers based on the rotary diffusional distribution of the fibers; and a controller connected to the computing apparatus and configured to control the molding machine with the molding condition to perform an actual molding for injecting the composite molding resin into at least a portion of the mold cavity;

wherein the rotary diffusional distribution of the fibers is represented using an expression:

$D_r = C_I R \hat{d}_r R^T$ $$\hat{d}_r = \begin{bmatrix} 1 & 0 & 0 \\ 0 & \Omega & 0 \\ 0 & 0 & 1-\Omega \end{bmatrix}$$

where $C_I$ represents an inter-fiber interaction, $D_r$ represents the rotary diffusional distribution of the fibers, R represents eigenvalues of the previous orientation distribution of the fibers, $R^T$ represents a transpose of R, $\Omega$ is a constant, and $0.5 \leq \Omega \leq 1$.

23. The molding system of claim 22, wherein the processor is also configured to generate an updated rotary diffusional distribution of the fibers based on the updated orientation distribution of the fibers.

24. The molding system of claim 23, wherein an effect of a shear rate distribution of the composite molding resin to the updated rotary diffusional distribution of the fibers is introduced through the updated orientation distribution.

25. The molding system of claim 23, wherein the processor is further configured to generate updated eigenvalues of the updated orientation distribution of the fibers.

26. The molding system of claim 22, wherein the processor is configured to generate the rotary diffusional distribution of the fibers based on the inter-fiber interaction, which is independent of a shear rate distribution of the composite molding resin in the mold cavity.

27. The molding system of claim 22, wherein the processor is configured to generate the rotary diffusional distribution of the fibers based on a constant inter-fiber interaction.

28. A molding system for preparing an injection-molded fiber-reinforced composite article, comprising:

a mold having a mold cavity;

a molding machine configured to fill the mold cavity with a composite molding resin including a polymeric material having a plurality of fibers;

a computing apparatus connected to the molding machine, wherein the computing apparatus is configured to generate a previous orientation distribution of the fibers in the mold cavity based on a molding condition for the molding machine, a rotary diffusional distribution of the fibers based on the previous orientation distribution of the fibers, and an updated orientation distribution of the fibers based on the rotary diffusional distribution of the fibers; and a controller connected to the computing apparatus and configured to control the molding machine with the molding condition to perform an actual molding for injecting the composite molding resin into at least a portion of the mold cavity;

wherein the rotary diffusional distribution of the fibers is independent of a velocity distribution of the composite molding resin in the mold cavity.

* * * * *